United States Patent [19]

Tamai

[11] Patent Number: 5,608,635
[45] Date of Patent: Mar. 4, 1997

[54] NAVIGATION SYSTEM FOR A VEHICLE WITH ROUTE RECALCULATION BETWEEN MULTIPLE LOCATIONS

[75] Inventor: Haruhisa Tamai, Sunnyvale, Calif.

[73] Assignee: Zexel Corporation, Tokyo, Japan

[21] Appl. No.: 341,518

[22] Filed: Nov. 17, 1994

Related U.S. Application Data

[63] Continuation-in-part of Ser. No. 213,268, Mar. 15, 1994, abandoned, which is a continuation of Ser. No. 869,142, Apr. 14, 1992, abandoned.

[51] Int. Cl.[6] ................................................. G06F 165/00
[52] U.S. Cl. ........................ 364/449.3; 340/990; 340/995
[58] Field of Search ................................. 364/443, 444, 364/449; 73/178 R; 340/988, 990, 995

[56] References Cited

U.S. PATENT DOCUMENTS

| | | | |
|---|---|---|---|
| 4,782,447 | 11/1988 | Ueno et al. | 340/995 |
| 4,796,189 | 1/1989 | Nakayama et al. | 364/444 |
| 4,926,336 | 5/1990 | Yamada | 364/444 |
| 4,954,959 | 9/1990 | Moroto et al. | 364/449 |
| 4,984,168 | 1/1991 | Neukrichner et al. | 340/995 |
| 5,041,983 | 8/1991 | Nakahara et al. | 340/990 |
| 5,072,395 | 12/1991 | Bliss et al. | 364/444 |
| 5,103,400 | 4/1992 | Yamada et al. | 340/995 |
| 5,107,433 | 4/1992 | Helldörfer et al. | 364/444 |
| 5,115,399 | 5/1992 | Nimura et al. | 364/444 |
| 5,191,532 | 3/1993 | Moroto et al. | 364/444 |
| 5,220,507 | 6/1993 | Kirson | 364/444 |
| 5,353,034 | 10/1994 | Sato et al. | 364/449 |

*Primary Examiner*—Gary Chin
*Attorney, Agent, or Firm*—Morrison Law Firm

[57] ABSTRACT

A vehicle navigation system guides a driver along an optimal route from a starting point to a destination, either of which can be specified in categorical terms. That is, the starting point need not be on a road, and the categorical destination can be entered as "nearest gas station" or "closest hardware store." The system selects a number of possible destinations that conform to the driver's specifications and computes, simultaneously for each particular area on a digitally-stored map, possible optimal routes from the vehicle's current position to each possible destination. The optimal route is selected according to conditions of shortest distance, fastest time, or fewest turns set individually or in any combination by the driver, who is guided along the optimal route by messages on a display. A similar procedure, in which a plurality of possible starting points is proposed, yields the optimal route to a destination from an indefinitely specified starting point. A weighting equation gives a priority within a particular map area to each possible optimal route. Thus the navigation system of the present invention finds most efficiently a desired destination on an optimal route from the vehicle's current position or from a starting point from which the vehicle's current position may be reached.

27 Claims, 10 Drawing Sheets

NAVIGATION SYSTEM FOR A VEHICLE WITH ROUTE RECALCULATION BETWEEN MULTIPLE LOCATIONS

This application is a Continuation-in-Part of Ser. No. 08/213,268, filed Mar. 15, 1994, which was in turn a Continuation of Ser. No. 07/869,142, filed Apr. 14, 1992, both now abandoned.

BACKGROUND OF THE INVENTION

This invention relates to a navigation system for a vehicle that assists the driver to guide the vehicle along a route to a destination.

In existing navigation systems based on route guidance, a suitable display helps the driver direct the vehicle to the destination. In such a navigation system, a road map is stored in a memory unit. When the driver enters the vehicle's current position and its destination, the system calculates a route to the destination and guides the driver along the route. The system gives the driver directions, such as "go straight," "turn left," "turn right," etc., well before the vehicle passes through the intersection where the driver must carry out the maneuver.

Such a conventional navigation system is disclosed, for example, in Japanese Laid-open Patent Publication No. 62-91811, in which an optimal route is computed between two designated places. When the destination is not a discrete place, the conventional navigation system either cannot guide the driver or can do so only with considerable inconvenience, because routes to a plurality of destinations must be calculated in sequence one after another and then compared. For example, the driver may wish to go to the nearest branch of a particular bank, e.g., Bank of America, or to the nearest of a chain of stores, e.g., K-mart. He may know where he wants to go only by what he needs rather than by location, e.g., the nearest hardware store. Further, when the vehicle's starting point is not on a road, e.g., the vehicle starts from a parking lot, its location with reference to a road network becomes uncertain, so that there exist a number of optional starting points. The conventional vehicle navigation system has great difficulty with any of these cases.

OBJECTS AND SUMMARY OF THE INVENTION

An object of the present invention is to provide an improved navigation system that guides a vehicle along a route to an optimal one among a plurality of proposed destinations even if the destination is uncertain.

A further object of the present invention is to provide an improved navigation system that guides a vehicle along a route to a destination from an optimal one among a plurality of starting points even if the starting point is uncertain.

Still a further object of the present invention is to provide an improved navigation system that guides a vehicle along a route to a destination specified in general rather than specific terms, e.g., "nearest drugstore".

Briefly stated, the present invention provides a vehicle navigation system that guides a driver along an optimal route from a starting point to a destination, either of which can be specified in categorical terms. That is, the starting point need not be on a road, and the categorical destination can be entered as "nearest gas station" or "closest hardware store." The system selects a number of possible destinations that conform to the driver's specifications and computes, simultaneously for each particular area on a digitally-stored map, possible optimal routes from the vehicle's current position to each possible destination. The optimal route is selected according to conditions of shortest distance, fastest time, or fewest turns set individually or in any combination by the driver, who is guided along the optimal route by messages on a display. A similar procedure, in which a plurality of possible starting points is proposed, yields the optimal route to a destination from an indefinitely specified starting point. A weighting equation gives a priority within a particular map area to each possible optimal route. Thus the navigation system of the present invention finds most efficiently a desired destination on an optimal route from the vehicle's current position or from a starting point from which the vehicle's current position may be reached.

According to an embodiment of the invention, a vehicle navigation system that displays continuously a direction of a vehicle's motion, comprises: means for determining a current position of the vehicle; means for storing and retrieving a plurality of map data; means for partitioning the map data into a plurality of map areas; means for entering information about at least one proposed categorical destination; the information including at least one element that does not recite specific geographic coordinates; means for selecting the at least one proposed categorical destination from the plurality of map data in accordance with the information; means, responsive to the means for selecting, for computing a plurality of proposed routes to the at least one proposed categorical destination; means for comparing the plurality of proposed routes to geographic destinations that correspond to the at least one proposed categorical destination in each partitioned map area; the means for computing being effective to choose a single geographic destination and a single optimal route thereto, whereby the single geographic destination and the single optimal route satisfy a preselected criterion of optimality derived from at least one variable independent of location and distance; and means, responsive to the means for computing, for displaying a plurality of navigational data to guide the vehicle along the optimal route from the vehicle's current position to the single geographic destination.

According to a feature of the invention, a vehicle navigation system that displays continuously a direction of a vehicle's motion comprises: means for determining a current position of the vehicle; means for storing and retrieving a plurality of map data; means for partitioning the map data into a plurality of map areas; means for entering information about at least one categorical destination; means, responsive to the means for entering, for selecting from the plurality of map data proposed starting points of a route for the vehicle to travel; means, responsive to the means for selecting, for computing a plurality of proposed routes from the proposed starting points to the at least one categorical destination; means for comparing the plurality of proposed routes from those of the proposed starting points in each partitioned map area; the means for computing being effective to choose a single one of the starting points and a single optimal one of the plurality of proposed routes therefrom such that the single starting point and the single optimal route satisfy a preselected criterion of optimality derived from at least one variable other than distance; and means, responsive to the means for computing, for displaying a plurality of navigational data to guide the vehicle along the single optimal route from the vehicle's current position to the at least one categorical destination.

According to another feature of the invention, a vehicle navigation system that displays continuously a direction of a vehicle's motion comprises: a CD ROM for storing and retrieving a plurality of map data; the map data disposed to be partitioned into a plurality of map areas; a shaft sensor; a terrestrial magnetism sensor; the shaft sensor and the terrestrial magnetism sensor including means for sending signals for determining a present location of the vehicle; a keypad for entering information about at least one proposed categorical destination; the information including at least one element that does not recite specific geographic coordinates; a microcomputer effective for selecting the at least one proposed destination from the plurality of map data in accordance with the information; the microcomputer being further effective for computing a plurality of proposed routes to the at least one proposed categorical destination; the microcomputer being further effective for comparing the plurality of proposed routes to geographic destinations that correspond to the at least one proposed categorical destination in each partitioned map area; the microcomputer being further effective to choose a single geographic destination and a single optimal route thereto, whereby the single geographic destination and the single optimal route satisfy a preselected criterion of optimality; the microcomputer being further effective for selecting from the plurality of map data at least one proposed starting point of the single optimal route; the microcomputer being further effective for computing a plurality of proposed routes from the at least one proposed starting point to the at least one proposed categorical destination for all geographic locations that correspond to the at least one proposed starting point in each partitioned map area; the preselected criterion of optimality being derived from at least one variable other than geographical location and distance; a CRT display for displaying information in response to signals from the microcomputer; and the CRT display being effective for displaying a plurality of navigational data to guide the vehicle along the single optimal route from the vehicle's current position to the at least one proposed categorical destination.

According to still another feature of the invention, a vehicle navigation system that displays continuously a direction of a vehicle's motion comprises: means for determining a current position of the vehicle; means for storing and retrieving map data; means for entering criteria for selection of a categorical destination and a route thereto; the criteria including at least one criterion that does not recite specific geographic coordinates; means for identifying possible destinations according to the criteria; means for computing possible routes from the current position to the possible destinations; the means for computing being effective to choose, according to the criteria, an optimal one of the possible destinations and, from the possible routes, an optimal route thereto; and means, responsive to the means for computing, for displaying a plurality of navigational data to guide the vehicle along the optimal route.

The above, and other objects, features, and advantages of the present invention will become apparent from the following description read in conjunction with the accompanying drawings, in which like reference numerals designate the same elements.

DETAILED DESCRIPTION OF PREFERRED EMBODIMENTS

Figure 1:
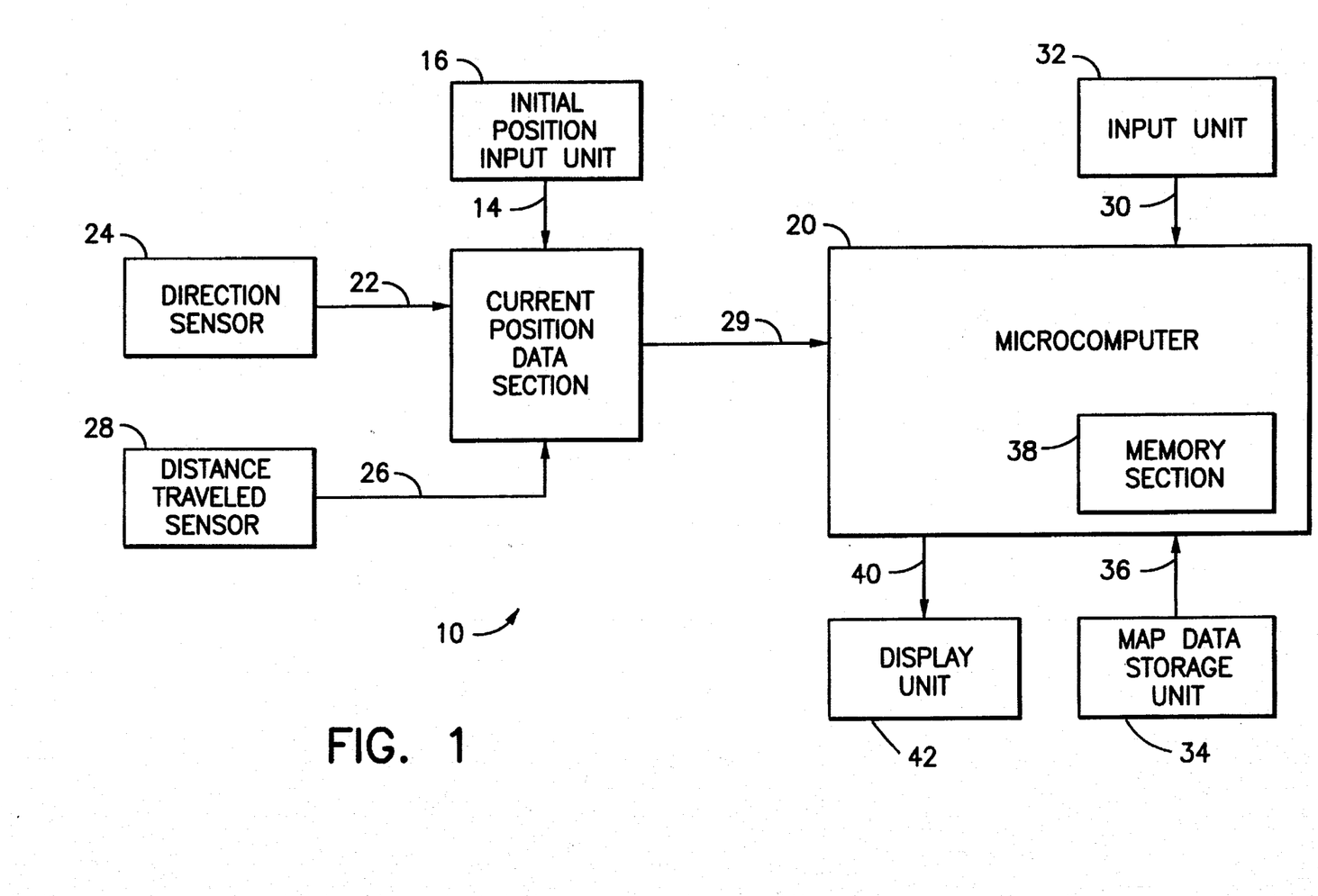
FIG. 1 is a schematic diagram of an embodiment of a navigation system according to the present invention.

Referring to FIG. 1, in a navigation system 10 on board a vehicle 12, a starting point 14 is entered into an initial position input unit 16, either manually by a user or automatically, for example, from a GPS reading of an absolute position. Initial position input unit 16 forwards starting point 14 to a current position data section 18 of a microcomputer 20. Current position data section 18 also receives: (1) a direction datum 22, showing the direction in which vehicle 12 is travelling, from a direction sensor 24; and (2) a distance datum 26, showing the distance vehicle 12 has traveled, from a distance travelled sensor 28. Current position data section 18 computes a current position 29 of vehicle 12 from the above data and forwards it to microcomputer 20.

A destination datum 30 is entered into an input unit 32 and forwarded to microcomputer 20. Input unit 32 can also accept for entry a pre-selected optimal route. A map data storage unit 34 forwards a plurality of map data 36 to a memory section 38 of microcomputer 20. From current position 29 and map data 36, microcomputer 20 computes a plurality of route guidance display data 40 necessary to guide vehicle 12 along a chosen route and forwards the plurality to a display unit 42 for display to the driver of vehicle 12. The driver is thereby informed in real time of what direction to take to follow the chosen route. This is the structure of a route guidance navigation system.

In the system of the present invention, input unit 32 can forward, not only a specified destination datum, but also a non-specific, categorical destination datum, such as "nearest drugstore" or "nearest gas station." Microcomputer 20 can work with either form of destination input.

In the present invention, "closest pharmacy" or "closest gas station" is an example of an ambiguous or non-specific destination defined by category. Categories such as "bank", "gas station", "police station", "hospital", and "airport" are examples of categorical destinations. Such destinations are useful in the following situations:

1. When fuel becomes low during driving, the driver wants to find the closest gas station as soon as possible but does not know in which direction to travel.
2. The driver suddenly feels sick while driving and wants to go to the closest pharmacy (or hospital) but does not know where to go.
3. The driver is on a long-distance trip and wants to stop at a nearby tourist spot. Even if the driver does not know the location or the name of such a place, the system can search for and guide the driver to an appropriate destination.

When data about a plurality of undetermined destinations is entered into microcomputer 20, these steps follow. First, a plurality of proposed destinations are selected. Second, the route to each proposed destination is computed. Third, those destinations that could be optimal are chosen. Finally, a series of route guidance display data 40 are output for the single route calculated to be optimal.

The following three factors: (1) whether the optimal route is a minimum distance, (2) whether the optimal route takes a minimum time, and (3) whether vehicle 12 can reach the destination with a minimum number of turns, determine whether a route is optimal. These factors enter into an evaluation function, whose calculation is the basis for choice among possible routes.

Each route has an index C. The value of C determines whether a route could possibly be optimal, and the route chosen to be the optimal route is the one with the minimum value of C. C is defined by equation 1 below.

$$C = aC_{turn} + bC_{dis} + cC_{time} + h \qquad (1)$$

where a, b, and c are coefficients, $C_{turn}$ is an index to be added for every turn, $C_{dis}$ is an index to be added for the distance to be travelled, $C_{time}$ is an index to be added for the lapse of time, and the variable h is a measure of the adequacy of the current route.

Equation 1 is evaluated in microcomputer 20, whose memory section 38 stores a data processing program whose output is route guidance display data 40.

Figure 2:
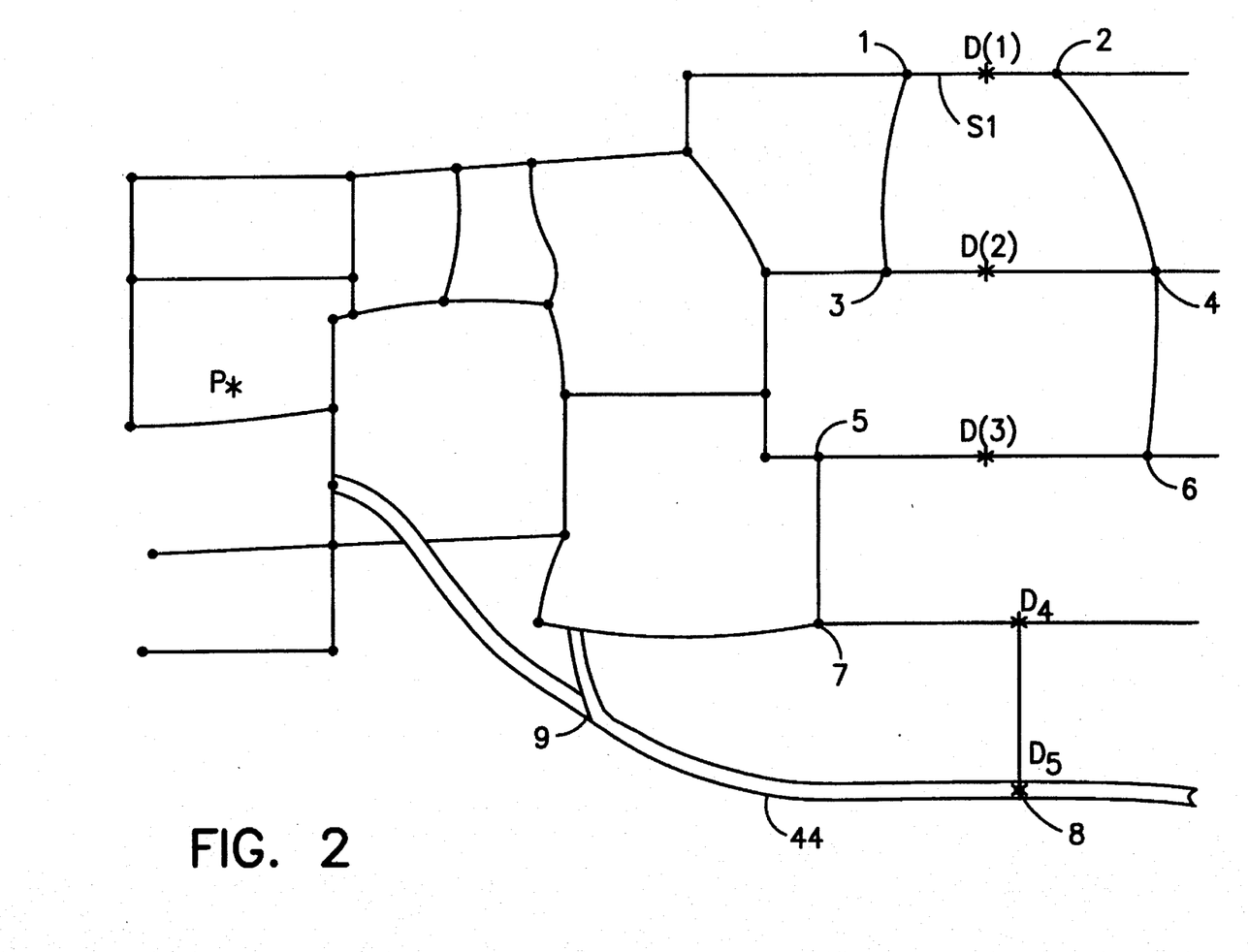
FIG. 2 is a road map comprising a plurality of segments and nodes that corresponds to map data stored in a navigation system of the present invention.

Referring to FIG. 2, an example of map data 36 stored in map data storage unit 34 shows that the data are a combination of a plurality of segments, each representing a road, and a plurality of nodes, each representing an intersection. Each segment is connected to the adjacent segment by a node.

The data for each segment include both its end nodes, its speed limit, and such additional information as its road surface. The data for each node include a number identifying each segment connected to it and information about whether it is possible to enter the segment, e.g., is it one-way in the opposite direction? How to prepare such a road database and then store it in memory section 38 is known in the art, so its further explanation is omitted.

Figure 3:
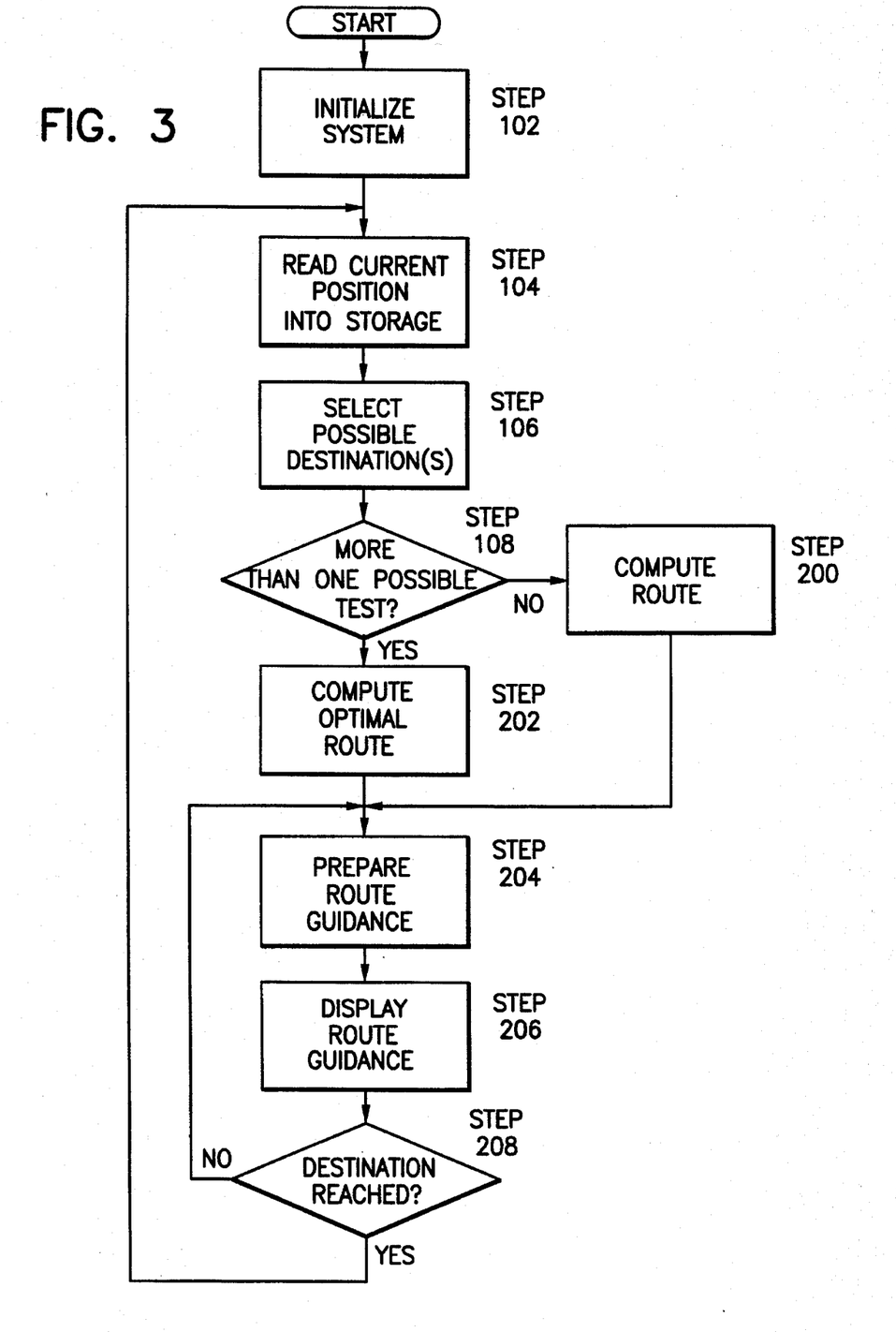
FIG. 3 is a flowchart of a program that is executed in the system of the present invention.

Referring to FIG. 3, the data processing program stored in memory section 38 starts by switching on navigation system 10 and initializing it (Step 102). Then each of starting point 14, direction datum 22, and distance datum 26 are read in from current position data section 18 and stored in memory section 38 (Step 104). Then the program selects a destination that accords with destination datum 30.

If destination datum 30 were to designate a single specified destination, the current navigation system could choose it as vehicle 12's destination. That is, Step 200 can be carried out in existing systems. However, when destination datum 30 designates a categorical destination, such as the nearest store among a number of related stores, e.g., the nearest Wal-Mart, only the navigation system of the present invention can make the choice. That is, when Step 108 returns a "yes," only the system of the present invention can continue the computation of the optimal route.

The program of FIG. 3 selects the plurality of proposed destinations D(i), where i=1, 2, . . . , n, that meet the specifications of destination datum 30 (Step 106). The program further determines whether a plurality has been selected (Step 108). The system is capable of selecting a desired destination out of the data about various stores that is stored in memory section 38. Destination datum 30 may be entered with limitations such as street name, city name, etc., or the plurality of proposed destinations may be entered by the driver directly into input unit 32. After the plurality of proposed destinations has been selected, the optimal route is chosen after a computation that seeks the optimal destination (Step 202).

Figure 4:
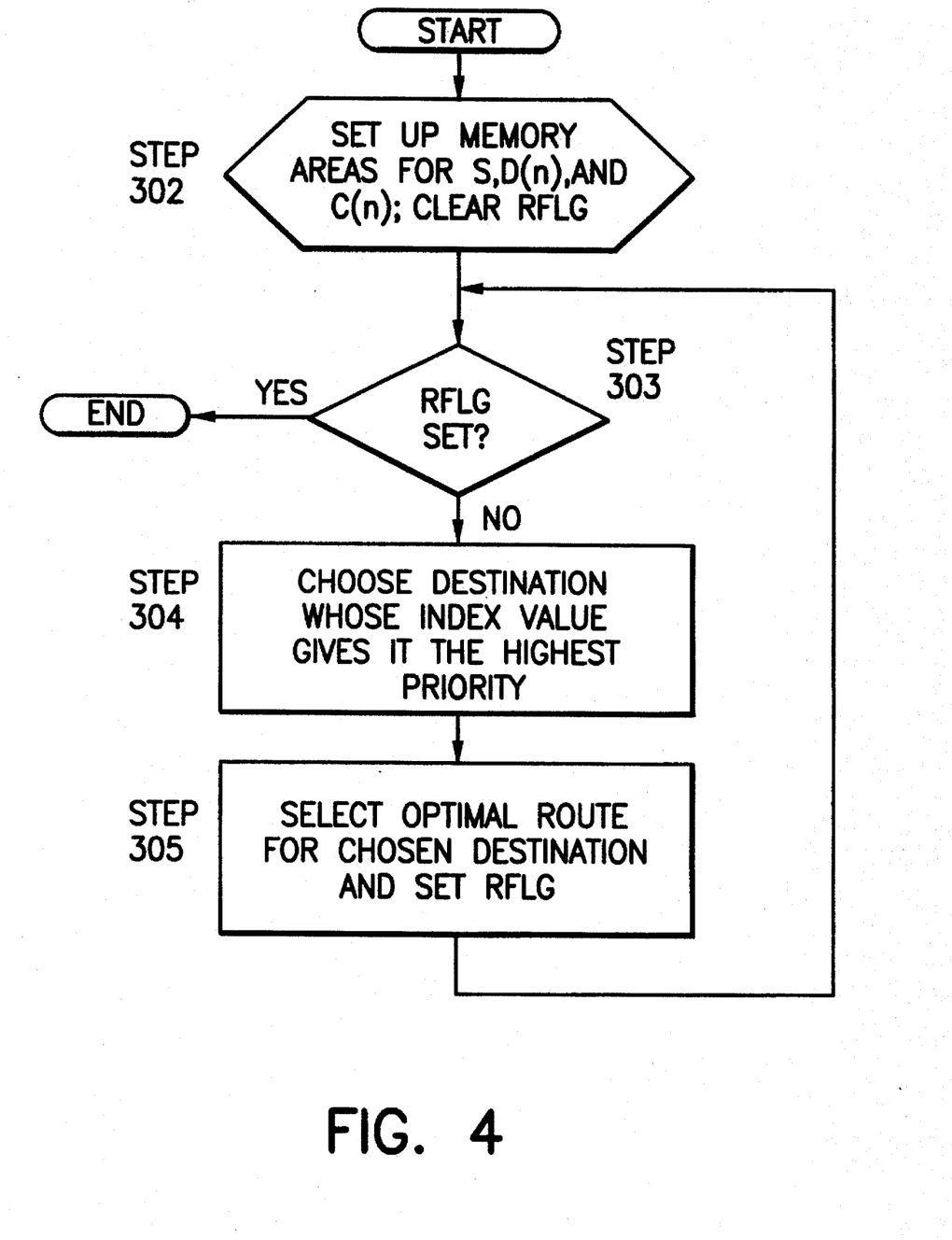
FIG. 4 is a detailed flowchart of a portion of the program flowcharted in FIG. 3.

Referring to FIG. 4, the subprogram that calculates the optimal route in Step 202 begins by establishing three data storage areas in memory section 38. The first stores a starting point S; the second, a plurality of destinations D(n); and the third, a plurality of prioritized index data C(n) of routes under consideration (Step 302). The index data C(n) consist of: a distance from vehicle 12's current position to the proposed destination, a kind of road surface, a width of the road, and similar information, with each road being assigned a priority. At the same time as the data storage areas are set up, the register RFLG, which shows that the optimal route has been chosen, is cleared.

Next a decision is made whether RFLG has been set (Step 303). At the beginning, RFLG is clear, so possible destinations are selected in sequence beginning with the one with the lowest value of index C (Step 304). Since at the beginning the priority of all destinations is zero, D(1) to D(n) are selected one after another.

Figure 6:
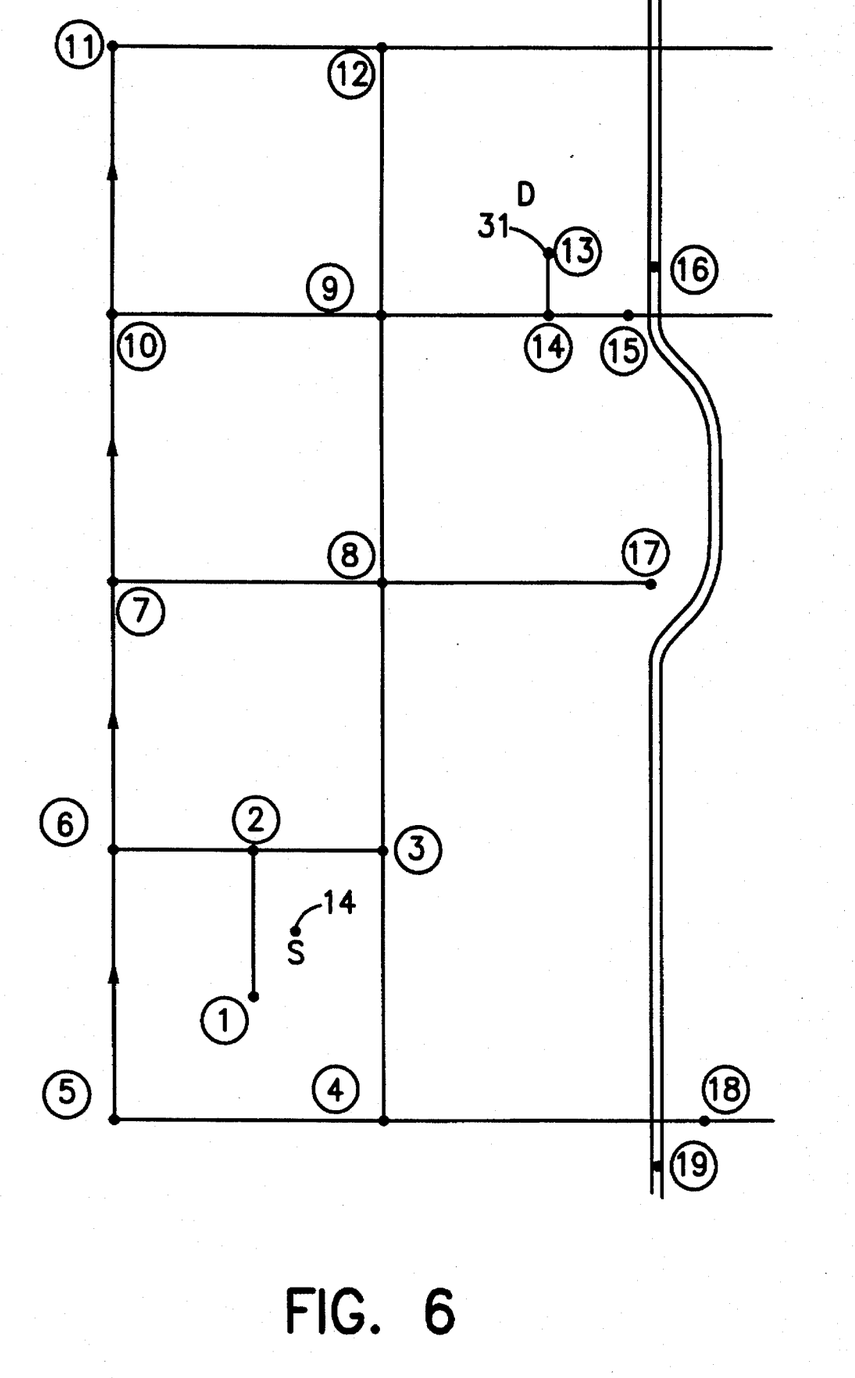
FIG. 6 is a road map that illustrates a basic concept for determining an optimal route in the navigation system of the present invention.

The basic concept of the route selection system will be described with reference to FIG. 6. In FIG. 6 a segment marked with an arrow defines a road that is one-way in the direction of the arrow. A segment with no arrow defines a road on which traffic travels in both directions, keeping to the right. A regular road, shown by a single line, has a speed limit of 40 km/hr. A highway, shown by a double line, has a speed limit of 100 km/hr. S marks starting point 14, which is located between a node 2 and a node 3 and directed towards node 3. Nodes are shown by numerals in a circle. Segments between nodes, e.g., between node 7 and node 8, are two kilometers in length. D marks a destination 31, which is located adjacent to node 13. The optimal route between them is selected by solving equation (1) above.

In this embodiment, h is defined as a measure of the degree to which the route under consideration meets the criteria of choice. Three examples are presented.

1. In the first example the optimal route is chosen according to a single criterion: shortest distance. In this case, the values of the coefficients a, b, and c are: a=c=0, b=1, because neither time nor number of turns are chosen criteria.

In this example, h is defined as a straight-line distance to the destination from the point for which the index C is calculated. That is, C is calculated by adding in succession values for each of the route segments passed over by vehicle 12. From the terminal point of each group of segments so calculated, a straight line is drawn to the destination. The length of that line is the value of h.

Vehicle 12 must travel from starting point 14, marked by S, to node 3 to enter the road network. The distance from starting point 14 (marked by S) to node 3 is 1. The straight-line distance from S to D is 5.5 (=h). Accordingly, for the route from S to node 3, $$C(0,3)=1+5.5=6.5.$$

From node 3, vehicle 12 next passes through either a node 4 or a node 8. The distance from node 3 to node 4 or node 8 is 2, which is added to 1, the distance between S and node 3. The straight-line distance from node 8 to D is 3.5 (=h). Calculating, $$C(0,3,8)=3+3.5=6.5.$$

Similarly, $$C(0,3,4)=3+7=10.$$

Adjacent to node 8 are nodes 7, 9, and 17. Adjacent to node 4 are nodes 5 or 19. Hence, calculating and assigning priority according to the chosen criterion:

$C(0,3,8,7) = 5 + 4 = 9$     Priority 3
$C(0,3,8,9) = 5 + 1.7 = 6.7$     Priority 1
$C(0,3,17) = 5 + 2.5 = 7.5$     Priority 2
$C(0,3,4,5) = 5 + 8 = 13$     Reserved
$C(0,3,4,19) = 4 + 6.5 = 10.5$     Reserved To shorten computing time, a priority is assigned only to the three most likely routes, whose continuations will be computed. The rest are reserved.

From node 7, only node 10 is available (because the road to node 6 is one-way in the opposite direction).

$$C(0,3,8,7,10)=7+3.7=10.7$$

From node 9, nodes 14, 10 and 12 are available.

$$C(0,3,8,9,14)=6.5+0.5=7$$

$$C(0,3,8,9,10)=7+3.7=10.7$$

$$C(0,3,8,9,12)=7+1.7=8.7$$

Thus the shortest two are: C(0,3,8,9,14), C(0,3,8,9,12). The other two are of equal length, so there is no third shortest.

From node 14, nodes 13 (destination 31) and 15 are available. Calculating in sequence, $$C(0,3,8,9,14,13)=7+0 \text{ (destination 31 reached)}$$

Thus the system has found the predicted optimal route having the shortest distance. Computation can either be terminated, or it can be continued until the system selects a number of other possible routes to a desired destination.

2. In the second example, the optimal route is again chosen according to a single criterion: shortest time.

The same computation is carried out for equation (1), with a=b=0 and c=1. In this example, the values of h are estimated times to reach destination 31 at the assumed speed of 40 km/hr.

$C(0,3)$   =   1 km/40 km/hr + 5.5 km/40 km/hr
        = 0.025 + 0.1375 = 0.1625 hr
$C(0,3,8) = 0.025 + 3.5/40 = 0.1125$
$C(0,3,4) = 0.025 + 7/40 = 0.2$ From node 8, nodes 7, 9, and 17 are available.

$C(0,3,8,7) = 0.1125 + 0.1 = 0.2125$     Priority 3
$C(0,3,8,9) = 0.1125 + 0.0425 = 0.155$     Priority 1
$C(0,3,8,17) = 0.1125 + 0.0625 = 0.175$     Priority 2

From node 4, nodes 5 and 16 are available.

$C(0,3,4,5) = 0.125 + 0.2 = 0.325$     Reserved.
$C(0,3,4,18) = 0.1 + 0.1625 = 0.2625$     Reserved.

From node 9, nodes 14, 10, and 12 are available.

$$C(0,3,8,9,14)=0.1625+0.0125=0.175$$

$$C(0,3,8,9,10)=0.1725+0.0925=0.265$$

$$C(0,3,8,9,12)=0.1725+0.0425=0.215$$

From node 7, only 10 is available.

$$C(0,3,8,7,10)=0.1725+0.0925=0.265$$

From node 14, $$C(0,3,8,9,14,13)=0.175+0 \text{ (destination 31 reached)}$$

Thus the system chooses the same route as in example 1. In this case, however, the search is repeated to find another route. Omitting intermediate details, since C(0,3,4,18), which has been reserved, is just below the priority choices, it is adopted as the next proposed route.

$$C(0,3,4,18)=0.1+0.1625=0.2625$$

$$C(0,3,4,18,19)=0.10625+0.1625=0.26875$$

$$C(0,3,4,18,19,16)=0.17625+0.0125=0.18875$$

$$C(0,3,4,18,19,16,15)=0.1825+0.025=0.2075$$

$$C(0,3,4,18,19,16,15,14)=0.195+0.025=0.22$$

$$C(0,3,4,18,19,16,15,14,13)=0.22+0 \text{ (destination 31 reached)}$$

After the two prospective optimal routes are compared, C(0,3,8,9,14,13) is again selected as the optimal route.

3. In the third example, the optimal route is once again chosen according to a single criterion: the smallest number of turns. The value of the coefficients a, b, and c is therefore:

$$a=1, b=c=0$$

To carry out the computation, the penalty value of each kind of turn must be set. For example, the value may be set as follows:

| | |
|---|---|
| Straight ahead | 0 |
| Right turn | 1 |
| Left turn | 3 |

Since straight ahead carries no penalty, route selection is biased towards as straight a route as possible. The calculation yields results similar to the previous examples and will therefore not be performed.

In general, to obtain the optimal route one must set experimental or empirical values for quantities a, b, c, and h and for the penalty value of turns.

Figure 5:
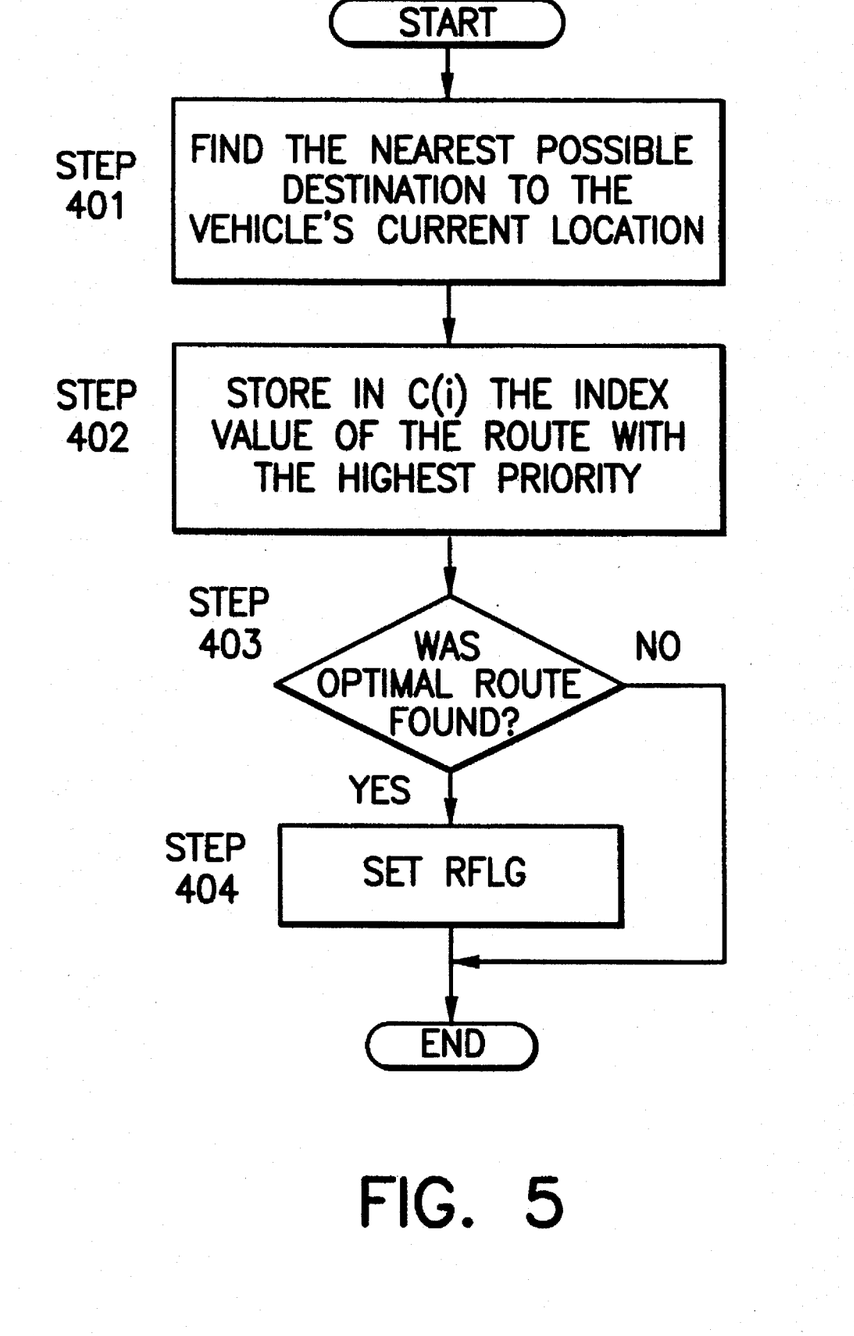
FIG. 5 is a detailed flowchart of a portion of the program flowcharted in FIG. 4.

The route determining program, which has been described with reference to the road map of FIG. 6, will now be described with reference to the flow charts of FIGS. 4 and 5. To find a proposed destination D(1), e.g., a first proposed destination D(1), the program searches from the present location for only one node (Step 401).

Referring again to FIG. 2, the road map consists of a plurality of segments and nodes. When a plurality of proposed destinations D(1), D(2), D(3), D(4), D(5) are selected relative to a present location P of vehicle 12, the program first searches for proposed destination D(1). Since D(1) is located on a segment S1, computation starts from it. The nearest nodes to D(1) are nodes 1 and 2, which are positioned at both ends of segment S1.

This search for a proposed destination is repeated until one of the proposed destinations is connected to the current position P. When the proposed destination is connected to the current position P, a flag is set in register RFLG (Step 403), and the optimal destination is determined.

On the other hand, when the proposed destination is not connected to the current position, so that no route is chosen and no flag is set in register RFLG, the program goes from Step 303 to Step 304. Then, as discussed above, the optimal destination is determined. Next the optimal route to the chosen destination is selected in Step 305, and the program returns to Step 303. If a single destination is specified, it is selected automatically in Step 304.

Referring once more to FIG. 3, the computation of the optimal route is completed in Step 202. Then information for guiding vehicle 12 along the optimal route is computed (Step 204) and displayed (Step 206). Then a decision is made whether vehicle 12 has arrived at destination 31 (Step 208) by comparing the coordinates of the present location with those of destination 31. If vehicle 12 has not arrived at destination 31, the program returns to Step 204. If vehicle 12 has arrived at destination 31, the program returns to Step 104.

According to the present embodiment (FIGS. 3–5), when a plurality of proposed destinations are selected simultaneously, precedence is given to the destination whose index number has the highest priority. Accordingly, when two out of the plurality of proposed destinations merge, the proposed destination having the higher index number is eliminated.

The above description applies to a plurality of undetermined destinations 31. It may also be applied to a plurality of starting points 14.

Figure 7:
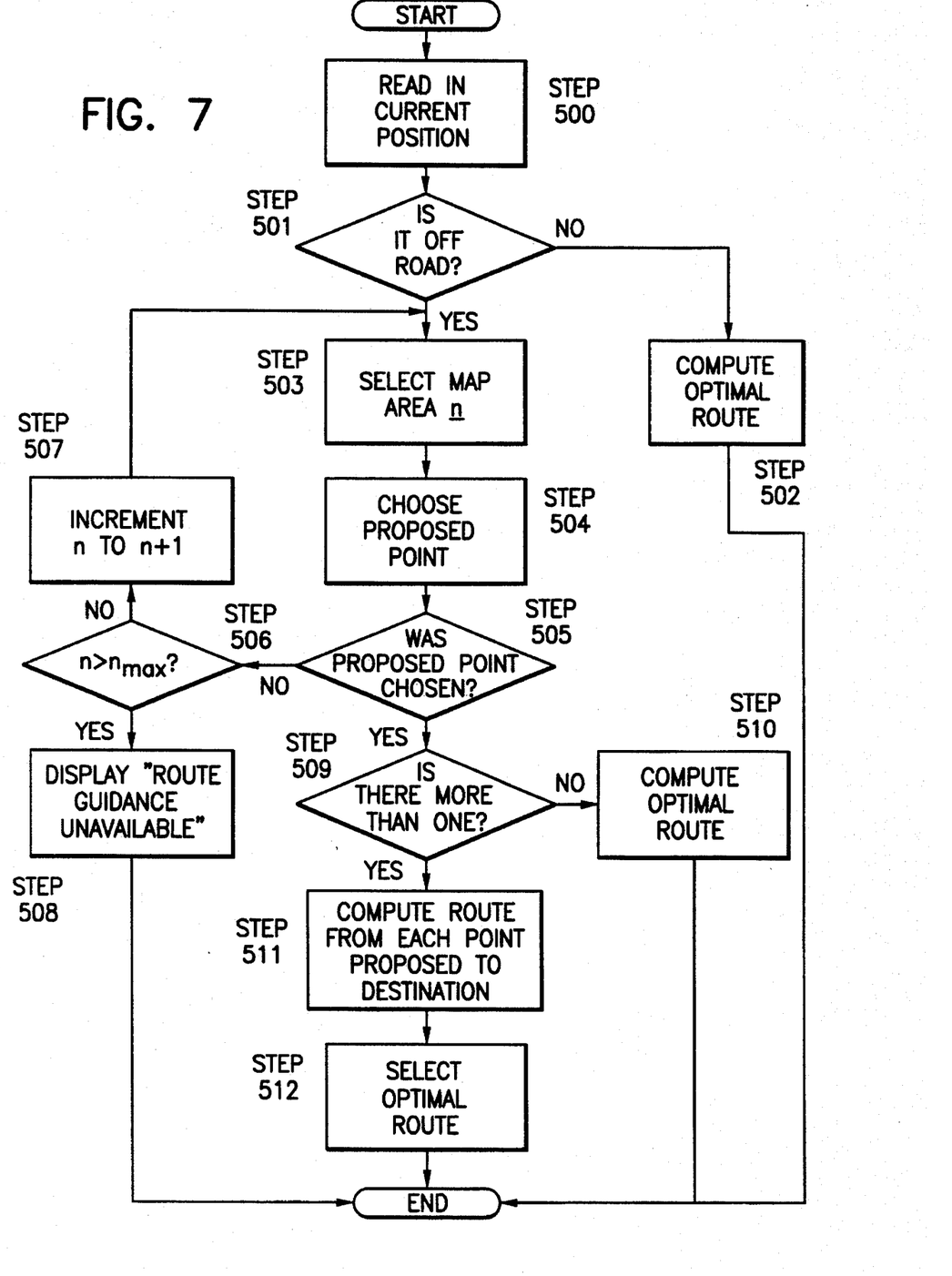
FIG. 7 is a flowchart of a program for determining an optimal route when an indefinite starting point is entered into the system of the present invention.

Referring to FIG. 7, when vehicle 12 is on the road and a plurality of starting points 14 are proposed for a route to a desired destination, the system must determine the optimal route thereto. After the program starts, vehicle 12's present location is read in (Step 500).

Next the program determines whether or not vehicle 12 is off the road (Step 501). If vehicle 12 is on the road, its current position is a suitable starting point 14, and an optimal route is computed from the current position and from map data 36 (Step 502). The optimal route must satisfy one or more of the following conditions: shortest distance, shortest time, and/or fewest turns. The optimal route may be entered manually through input unit 32, or it may be entered into microcomputer 20 before the journey begins.

When vehicle 12 is off the road, a map area 46 is partitioned off from map data 36 (Step 503). Map area 46 contains one or more proposed starting points 14 and vehicle 12's current position.

Figure 8:
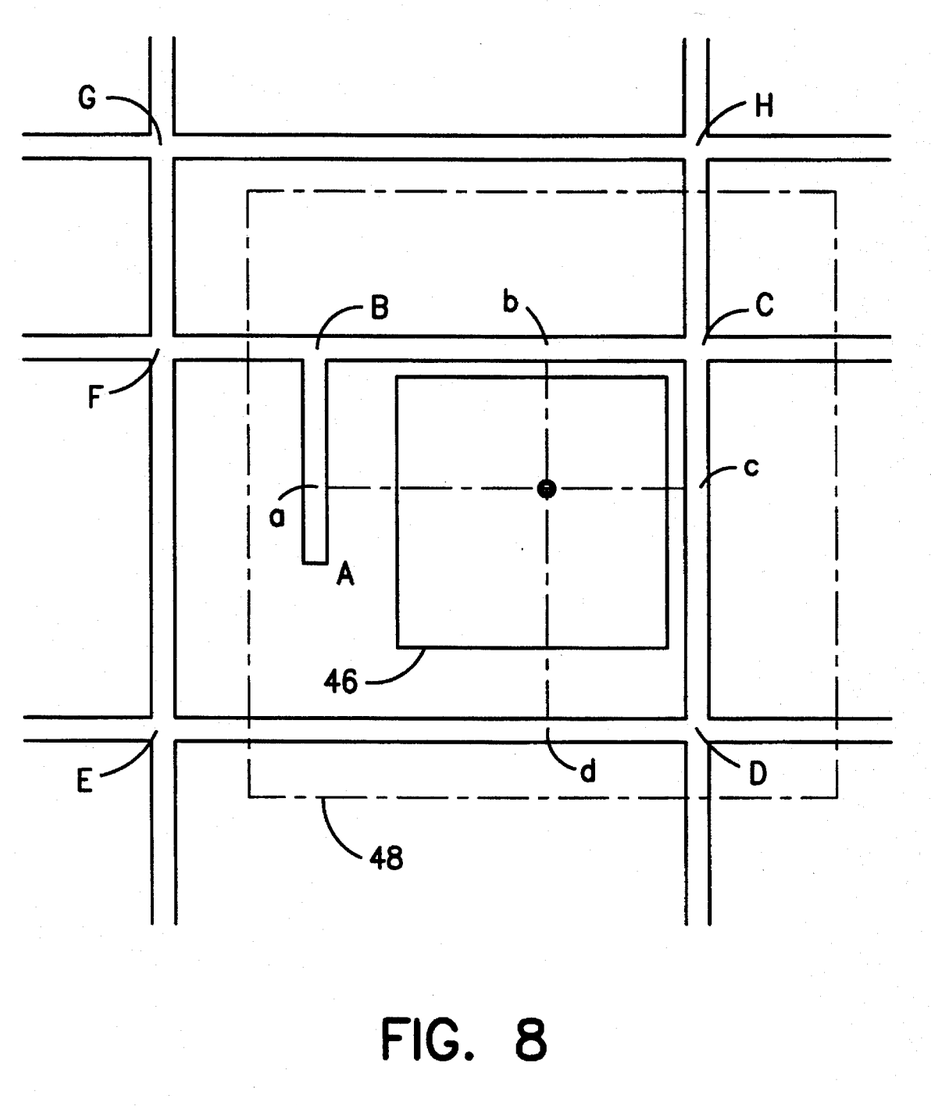
FIG. 8 is a detailed road map that illustrates the procedure for selecting a starting point on a road.

Referring to FIG. 8, the procedure for determining starting point 14 on the road begins with a detailed road map stored as map data 36 in map data storage unit 34. Vehicle 12's current position, where it is parked off the road, is marked with a double circle. In this embodiment map area 46 is defined as a square in which vehicle 12's current position is centered.

A single map area, for which n=1, or a plurality of such areas, n=1, 2, 3, . . . , 6, each of a different size, may be defined by partitioning map data 36. For example, a series of areas of 500, 600, 700, 800, 900 or 1,000 square meters (from 500 up to 1,000 square meters) are possible. In this case, n=1 defines map area 46 of 500 square meters, and n=3 defines a map area 48 of 700 square meters.

Map area 46 may also be delineated by a circle in which vehicle 12's current position is centered.

Referring once more to FIG. 7, a proposed starting point 14 in map area 46 is selected (Step 504). Proposed starting point 14 may be a segment, a specified point on a segment, or a node. Each such point must exist in map area 46. For example, as shown in FIG. 8, when it is proposed to make starting point 14 a segment, any of the following four segments would be suitable: A–B, B–C, C–D, or D–E. When a specified point on a segment is the proposed starting point, any point on any segment will be suitable. Usually a point at the end of a line drawn from current position 29 perpendicular to a given segment is chosen as the proposed starting point. In FIG. 8, points a, b, c, and d may become starting point 14. Intersections B, C, and D are also suitable.

Further, a proposed starting point must be reachable from current position 29 without vehicle 12 passing through another proposed starting point. For example, in FIG. 8, even though segment G–H is located in map area 46, it cannot be reached unless vehicle 12 passes over another segment. Accordingly, segment G–H is omitted from the list of proposed starting points.

When the list contains a large number of proposed starting points, it is preferable to select the most suitable to reduce the time to compute routes. The most suitable starting point can be selected by giving a priority to each proposed starting point. Each proposed starting point has a specific priority based on: the distance from current position 29 to each proposed destination, the kind of road surface, the width of the road, etc. Thus, only a few points, each belonging to a top priority group, are selected in Step 504.

Next, a decision is made whether or not any proposed starting point has been selected (Step 505). When a proposed starting point has not been selected, the program confirms that there was no starting point in the first map area. Next a decision is made whether $n>n_{max}$ (Step 506). If $n<n_{max}$, the value of n is incremented by 1 (Step 507), and the program returns to Steps 504 and 505. Where $n>n_{max}$, a message "Route Guidance Unavailable" is shown on display unit 42 (Step 508). The program then terminates.

When the decision of Step 505 is affirmative, namely, when the proposed starting point is selected from the map area whose size is denoted by n, a decision is made whether the number of proposed starting points is greater than one (Step 509). When only one starting point is proposed, an optimal route is computed (Step 510) from that starting point as in Step 502.

When more than one starting point is proposed, a route is computed from each proposed starting point to its respective destination as in the previous embodiment.

Next, from the plurality of routes so computed, an optimal route satisfying the requisite conditions, such as shortest distance, shortest time, smallest number of turns, etc., is chosen (Step 512). The starting point of the optimal route becomes the selected starting point, and the program terminates.

After the starting point and the optimal route have been chosen, vehicle 12 must be driven to starting point 14.

Vehicle 12's current position and direction of advance, map information, and the optimal route may be displayed on the screen of display unit 42 to help the driver reach starting point 14.

Figure 9A:
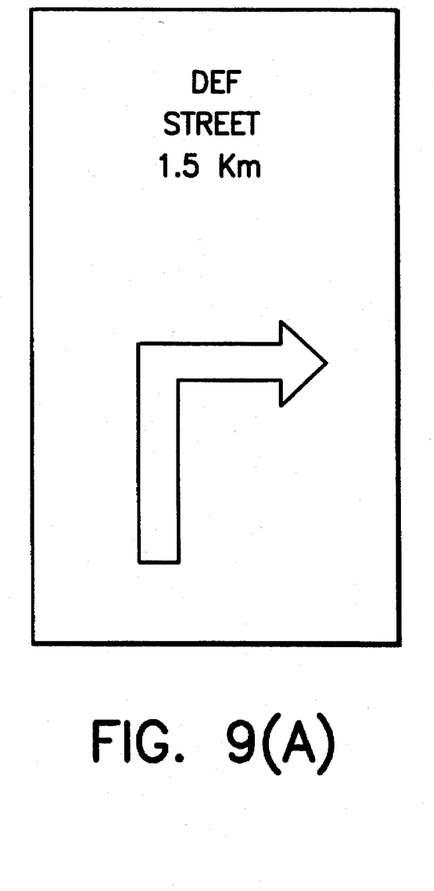
FIGS. 9(A) and 9(B) are respective displays for route guidance according to the navigation system of the present invention.
Figure 9B:
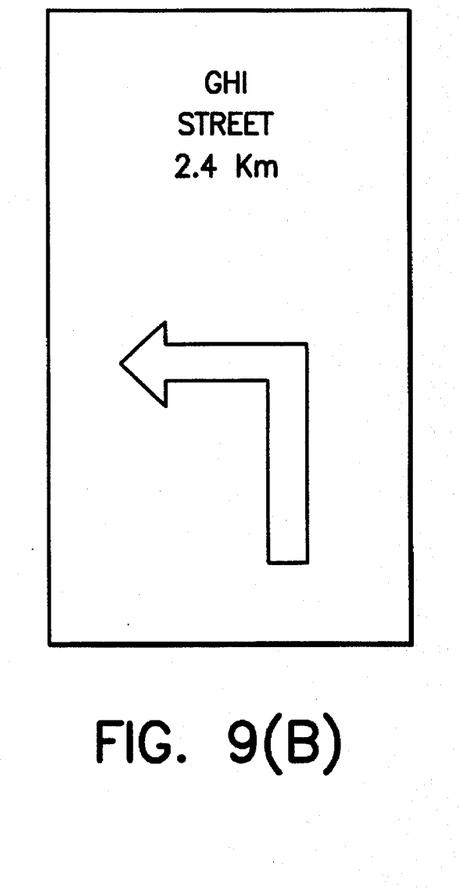

Referring to FIG. 9, after vehicle 12 has reached starting point 14, route guidance is computed for the optimal route and displayed to the driver. For example, vehicle 12 is currently travelling on Abc Street. To follow the optimal route, vehicle 12 has to turn right on to Def Street and then left on to Ghi Street. When vehicle 12 travels down Abc Street, the driver sees, on the screen of display unit 42, the name of the street, Def Street, into which he must turn; a distance, 1.5 Km, from the current position of vehicle 12 to the intersection; and a right turn arrow (FIG. 9(A)). After the driver turns into Def Street, the display changes to show him the name of Ghi Street, a distance of 2.4 Km from the current position of vehicle 12 to the intersection, and a left turn arrow (FIG. 9(B)).

As discussed above, according to the navigation system of the present invention, a proposed starting point can be selected from map area 46, within whose boundaries vehicle 12 can be found, whether on or off a road. From the starting point so selected, the destination and the optimal route from the starting point to the destination can be computed. Thus, even if vehicle 12 is off-road, it is possible to compute an optimal route, since the starting point for the optimal route need not be vehicle 12's present location. Accordingly, it is possible to guide vehicle 12 continuously from current position 29 to destination 31 even if current position 29 is off-road.

To perform a search for a categorical destination and guide vehicle 12 to it, map data storage unit 34 contains, not only map data 36, but also data from a commercial data base such as the business telephone directory ("Yellow Pages") of the area in which vehicle 12 is driving. These data are referred to hereinafter as points of interest ("POI").

Figure 10A:
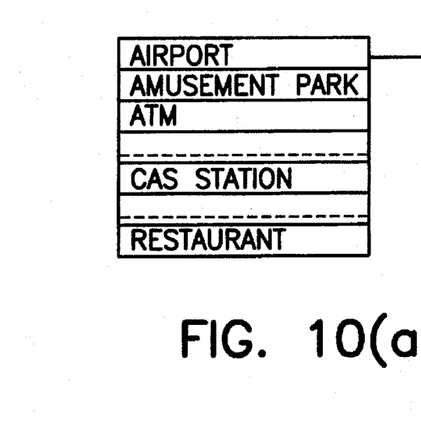
FIG. 10 contains, in the table on the left, a partial list of destination categories and, in the table on the right, a partial list of names and addresses of the actual locations within a category.
Figure 10B:
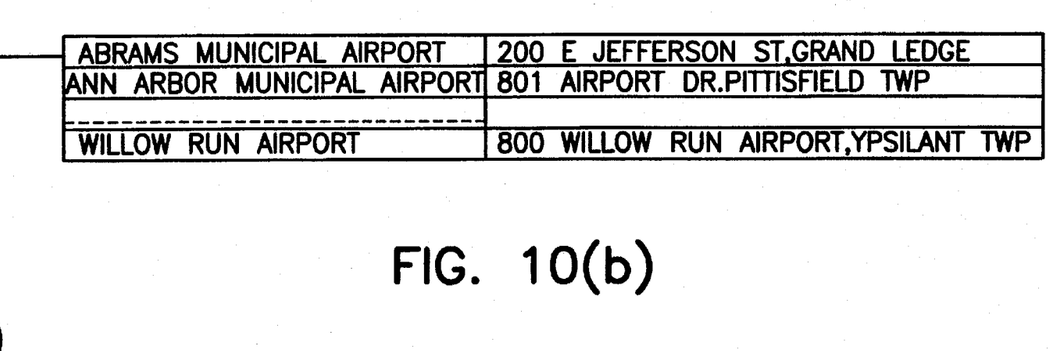

FIG. 10 shows the data structure of the POI. The left table of FIG. 10 shows a partial list of the POI organized alphabetically by categories. The right table of FIG. 10 shows a partial list of names and addresses for one category: airports. Similar lists of actual locations are available for each category.

Figure 11:
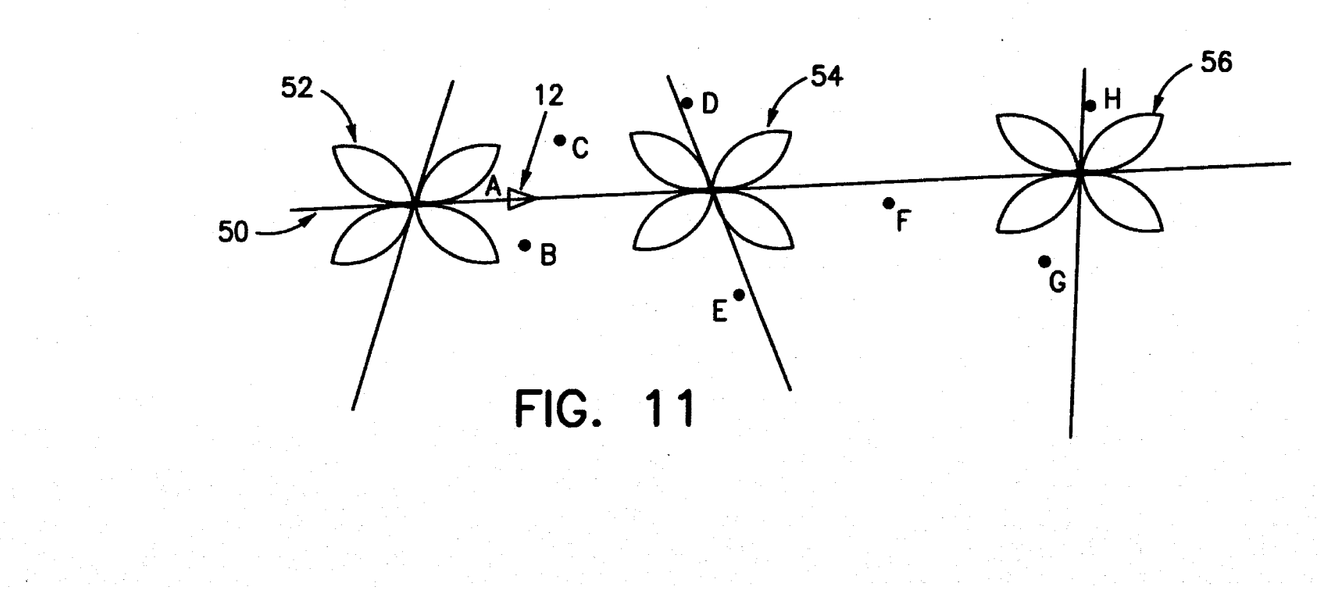
FIG. 11 is a map showing how a destination is chosen for a moving vehicle.

The following example describes how the POI data are used to search for a categorical destination and provide guidance to it. Referring to FIG. 11, vehicle 12 is driving on a freeway 50 with on-off ramps 52, 54, and 56. The driver wants to go to the nearest gas station.

First, referring again to FIG. 1, "nearest gasoline station" is entered as the categorical destination into input unit 32. Input unit 32 sends that data to microcomputer 20. Microcomputer 20 reads all the data in the gas station category of the POI data from map data storage unit 34 and selects a plurality of gas stations near current position 29 of vehicle 12. (Current position 29 is determined by current position data section 18, as described above.) Since the POI data contains addresses, the distances to their respective locations are calculated. The destination having the smallest calculated distance is then selected from the plurality of destinations.

In this example, gas stations B–E are selected as candidates. At the "compute optimal route" procedure (Step 202 in FIG. 3), the best destination and the route to that destination are determined.

While the above example uses current position 29 from which to select the possible destinations, this procedure does not necessarily result in selecting the most appropriate candidate destination. In FIG. 11, for example, the gas station that is closest to current position 29 of vehicle 12 is gas station B. However, the driver has already passed on-off ramp 52 that would lead vehicle 12 to gas station B, thus making gas stations D and E closer to drive to via on-off ramp 54. Furthermore, even if the destination point is chosen by using the closest intersection or on-off ramp as the reference point, it is possible for the vehicle to drive past that point while the calculations are being performed, thus creating the same problem as in the previous method.

Thus, in selecting the appropriate destination point, the point used as the reference point for selection becomes important. In the present invention, current position 29 is incremented by the product of vehicle speed and estimated calculation time ($P = S_{vehicle} * T_{estimated}$) in the direction of vehicle 12's motion. The reference point is then set to be the next intersection or on-off ramp after this calculated point. The estimated calculation time can be a constant or a variable computed using as a factor the number of entries in the chosen category.

By adding the above condition, a better destination point can be selected, guiding the driver to the optimal destination. In FIG. 11, D–H would be selected as candidate points.

Having described the preferred embodiments of this invention with reference to the accompanying drawings, it is to be understood that this invention is not limited to those precise embodiments, and that various changes and modifications may be effected therein by one skilled in the art without departing from the scope or spirit of this invention as defined in the appended claims.

What is claimed is:

1. A vehicle navigation system that displays continuously a direction of a vehicle's motion, comprising:

means for determining a current position of said vehicle;

means for storing and retrieving a plurality of map data;

means for partitioning said map data into a plurality of map areas;

means for entering information about at least one proposed categorical destination;

said information including at least one element that does not recite specific geographic coordinates;

means for selecting from one of a plurality of possible destinations in said storing means as said at least one proposed categorical destination in accordance with said information;

means, responsive to said means for selecting, for computing a plurality of proposed routes to said at least one proposed categorical destination;

means for comparing said plurality of proposed routes to geographic destinations that correspond to said at least one proposed categorical destination in each partitioned map area;

said means for computing being effective to choose a single geographic destination and a single optimal route thereto, whereby said single geographic destination and said single optimal route satisfy a preselected criterion of optimality derived from at least one variable independent of location and distance; and means, responsive to said means for computing, for displaying a plurality of navigational data to guide said vehicle along said optimal route from said vehicle's current position to said single geographic destination.

2. A vehicle navigation system as in claim 1, wherein:

said means for determining includes a shaft sensor, a terrestrial magnetism sensor, and a microcomputer;

said means for determining further includes means for applying signals from said shaft sensor and said terrestrial magnetism sensor to said microcomputer; and said microcomputer includes means tier computing said current position from said signals.

3. A vehicle navigation system as in claim 1, wherein said means for storing and retrieving includes a CD ROM.

4. A vehicle navigation system as in claim 1, wherein said means for storing and retrieving includes an IC card.

5. A vehicle navigation system as in claim 1, wherein said means for storing and retrieving includes a remote computer database.

6. A vehicle navigation system as in claim 1, wherein said means for entering includes a keypad.

7. A vehicle navigation system as in claim 1, wherein said means for entering includes a voice data entry unit.

8. A vehicle navigation system as in claim 1, wherein said means for selecting includes a microcomputer.

9. A vehicle navigation system as in claim 1, wherein said means for computing includes a microcomputer.

10. A vehicle navigation system as in claim 1, wherein said means for displaying includes a CRT.

11. A vehicle navigation system as in claim 1, wherein said means for displaying includes a LCD.

12. A vehicle navigation system as in claim 1, wherein said preselected criterion of optimality is derived by combining a minimum time, a minimum distance, and a minimum number of turns.

13. A vehicle navigation system that displays continuously a direction of a vehicle's motion, which comprises:

means for determining a current position of said vehicle;

means for storing and retrieving a plurality of map data;

means for partitioning said map data into a plurality of map areas;

means for entering information about at least one categorical destination;

means for selecting from one of a plurality of possible destinations in said storing means as said at least one proposed categorical destination in accordance with said information;

means, responsive to said means for entering, for selecting from said plurality of map data proposed starting points of a route for said vehicle to travel;

means, responsive to said means for selecting, for computing a plurality of proposed routes from said proposed starting points to said at least one categorical destination;

means for comparing said plurality of proposed routes from each of said proposed starting points with each other in each partitioned map area;

said means for computing being effective to choose a single one of said starting points and a single optimal one of said plurality of proposed routes therefrom such that said single starting point and said single optimal route satisfy a preselected criterion of optimality derived from at least one variable other than distance; and means, responsive to said means for computing, for displaying a plurality of navigational data to guide said vehicle along said single optimal route from said vehicle's current position to said at least one categorical destination.

14. A vehicle navigation system as in claim 13, wherein:

said means for determining includes a shaft sensor, a terrestrial magnetism sensor, and a microcomputer;

said means for determining further includes means for applying signals from said shaft sensor and said terrestrial magnetism sensor to said microcomputer; and said microcomputer includes means for computing said current position from said signals.

15. A vehicle navigation system as in claim 13, wherein said means for storing and retrieving includes a CD ROM.

16. A vehicle navigation system as in claim 13, wherein said means for storing and retrieving includes an IC card.

17. A vehicle navigation system as in claim 13, wherein means for storing and retrieving includes a remote computer database.

18. A vehicle navigation system as in claim 13, wherein said means for entering includes a keypad.

19. A vehicle navigation system as in claim 13, wherein said means for entering includes a voice data entry unit.

20. A vehicle navigation system as in claim 13, wherein said means for selecting includes a microcomputer.

21. A vehicle navigation system as in claim 13, wherein said means for computing includes a microcomputer.

22. A vehicle navigation system as in claim 13, wherein said means for displaying includes a CRT.

23. A vehicle navigation system as in claim 13, wherein said means for displaying includes a LCD.

24. A vehicle navigation system as in claim 13, wherein said preselected criterion of optimality is derived by combining a minimum time, a minimum distance, and a minimum number of turns.

25. A vehicle navigation system that displays continuously a direction of a vehicle's motion, which comprises:

a CD ROM for storing and retrieving a plurality of map data;

said map data disposed to be partitioned into a plurality of map areas;

a shaft sensor;

a terrestrial magnetism sensor;

said shaft sensor and said terrestrial magnetism sensor including means for sending signals for determining a present location of said vehicle;

a keypad for entering information about at least one proposed categorical destination;

said information including at least one element that does not recite specific geographic coordinates;

a microcomputer effective for selecting from one of a plurality of possible destinations in said CD ROM as said at least one proposed categorical destination in accordance with said information;

said microcomputer being further effective for computing a plurality of proposed routes to said at least one proposed categorical destination;

said microcomputer being further effective for comparing said plurality of proposed routes to geographic destinations that correspond to said at least one proposed categorical destination in each partitioned map area;

said microcomputer being further effective to choose a single geographic destination and a single optimal route thereto, whereby said single geographic destination and said single optimal route satisfy a preselected criterion of optimality;

said microcomputer being further effective for selecting from said plurality of map data at least one proposed starting point of said single optimal route;

said microcomputer being further effective for computing a plurality of proposed routes from said at least one proposed starting point to said at least one proposed categorical destination for all geographic locations that correspond to said at least one proposed starting point in each partitioned map area;

said preselected criterion of optimality being derived from at least one variable other than geographical location and distance;

a CRT display for displaying information in response to signals from said microcomputer; and said CRT display being effective for displaying a plurality of navigational data to guide said vehicle along said single optimal route from said vehicle's current position to said at least one proposed categorical destination.

26. A vehicle navigation system as in claim 25, wherein said first and said second preselected criteria of optimality are derived by combining a minimum time, a minimum distance, and a minimum number of turns.

27. A vehicle navigation system that displays continuously a direction of a vehicle's motion, comprising:

means for determining a current position of said vehicle;

means for storing and retrieving map data;

means for entering criteria for selection of a categorical destination and a route thereto;

said criteria including at least one criterion that does not recite specific geographic coordinates;

means for identifying possible destinations in said storing means as said categorical destination according to said criteria;

means for computing possible routes from said current position to said possible destinations;

said means for computing being effective to choose, according to said criteria, an optimal one of said possible destinations and, from said possible routes, an optimal route thereto; and means, responsive to said means for computing, for displaying a plurality of navigational data to guide said vehicle along said optimal route.

* * * * *